United States Patent
Kinross et al.

(10) Patent No.: US 10,546,416 B2
(45) Date of Patent: Jan. 28, 2020

(54) TECHNIQUES FOR MODIFYING GRAPHICS PROCESSING UNIT (GPU) OPERATIONS FOR TRACKING IN RENDERING IMAGES

(71) Applicant: Microsoft Technology Licensing, LLC, Redmond, WA (US)

(72) Inventors: Austin Neil Kinross, Redmond, WA (US); Shawn Lee Hargreaves, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 15/910,534

(22) Filed: Mar. 2, 2018

(65) Prior Publication Data

US 2019/0272662 A1 Sep. 5, 2019

(51) Int. Cl.
| | |
|---|---|
| *G06T 15/50* | (2011.01) |
| *G06T 15/80* | (2011.01) |
| *G06T 1/20* | (2006.01) |
| *G06F 8/41* | (2018.01) |

(52) U.S. Cl.
CPC .............. *G06T 15/50* (2013.01); *G06T 15/80* (2013.01); *G06F 8/4441* (2013.01); *G06T 1/20* (2013.01)

(58) Field of Classification Search
CPC ......... G06T 15/005; G06T 1/20; G06T 15/80; G06F 11/3636; G06F 8/4441
See application file for complete search history.

(56) References Cited

U.S. PATENT DOCUMENTS

| | | | |
|---|---|---|---|
| 8,847,966 B2 | 9/2014 | Williams | |
| 8,872,823 B2 | 10/2014 | Gould et al. | |
| 2011/0234587 A1* | 9/2011 | Maigret | G06T 15/50 |
| | | | 345/419 |
| 2016/0225117 A1* | 8/2016 | Sarna | G06T 15/005 |
| 2016/0225118 A1* | 8/2016 | Nevraev | G06T 1/20 |
| 2018/0349119 A1* | 12/2018 | Zaidi | G06F 8/4441 |

OTHER PUBLICATIONS

"International Search Report and Written Opinion Issued in PCT Application No. PCT/US2019/018852", dated May 6, 2019, 14 Pages.

* cited by examiner

*Primary Examiner* — Hau H Nguyen
(74) *Attorney, Agent, or Firm* — Arent Fox LLP

(57) ABSTRACT

Examples described herein generally relate to modifying operations of a graphics processing unit (GPU) for tracking. An indication of multiple shaders to be executed in rendering an image can be obtained from a command buffer of commands to be provided to the GPU for rendering the image. At least one shader of the multiple shaders can be modified to generate a modified shader that includes a command to log one or more parameters when executing the modified shader. The command buffer can be provided to the GPU for executing the commands for rendering the image including executing the modified shader.

17 Claims, 5 Drawing Sheets

TECHNIQUES FOR MODIFYING GRAPHICS PROCESSING UNIT (GPU) OPERATIONS FOR TRACKING IN RENDERING IMAGES

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. GPUs can typically perform rasterization operations to draw the images based on rendering instructions and/or ray tracing to emulate photons of light sent out via rays and to determine where light reflects, trace a point where the light returns from the scene, etc. to generate the images.

Tools have been developed for logging rendering instructions received from an application, from which a graphics driver can generate GPU-specific commands for executing on a GPU. The graphics driver and/or corresponding GPU, however, can defer execution of the GPU-specific commands until an indeterminable time in the future, and thus logging related to the rendering instructions may not provide desirable or accurate timing information related to GPU performance and command execution.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for modifying operations of a graphics processing unit (GPU) for tracking is provided. The method includes obtaining, from a command buffer of commands to be provided to the GPU for rendering an image, an indication of multiple shaders to be executed in rendering the image, modifying at least one shader of the multiple shaders to generate a modified shader that includes a command to log one or more parameters when executing the modified shader, and providing the command buffer to the GPU for executing the commands for rendering the image including executing the modified shader.

In another example, a computing device for modifying operations of a GPU for tracking is provided. The computing device includes a memory storing one or more parameters or instructions for executing an operating system and one or more applications including a logging application, and at least one processor coupled to the memory. The at least one processor is configured to obtain, from a command buffer of commands to be provided to the GPU for rendering an image, an indication of multiple shaders to be executed in rendering the image, modify at least one shader of the multiple shaders to generate a modified shader that includes a command to log one or more parameters when executing the modified shader, and provide the command buffer to the GPU for executing the commands for rendering the image including executing the modified shader.

In another example, a computer-readable medium, including code executable by one or more processors for modifying operations of a GPU for tracking is provided. The code includes code for obtaining, from a command buffer of commands to be provided to the GPU for rendering an image, an indication of multiple shaders to be executed in rendering the image, modifying at least one shader of the multiple shaders to generate a modified shader that includes a command to log one or more parameters when executing the modified shader, and providing the command buffer to the GPU for executing the commands for rendering the image including executing the modified shader.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
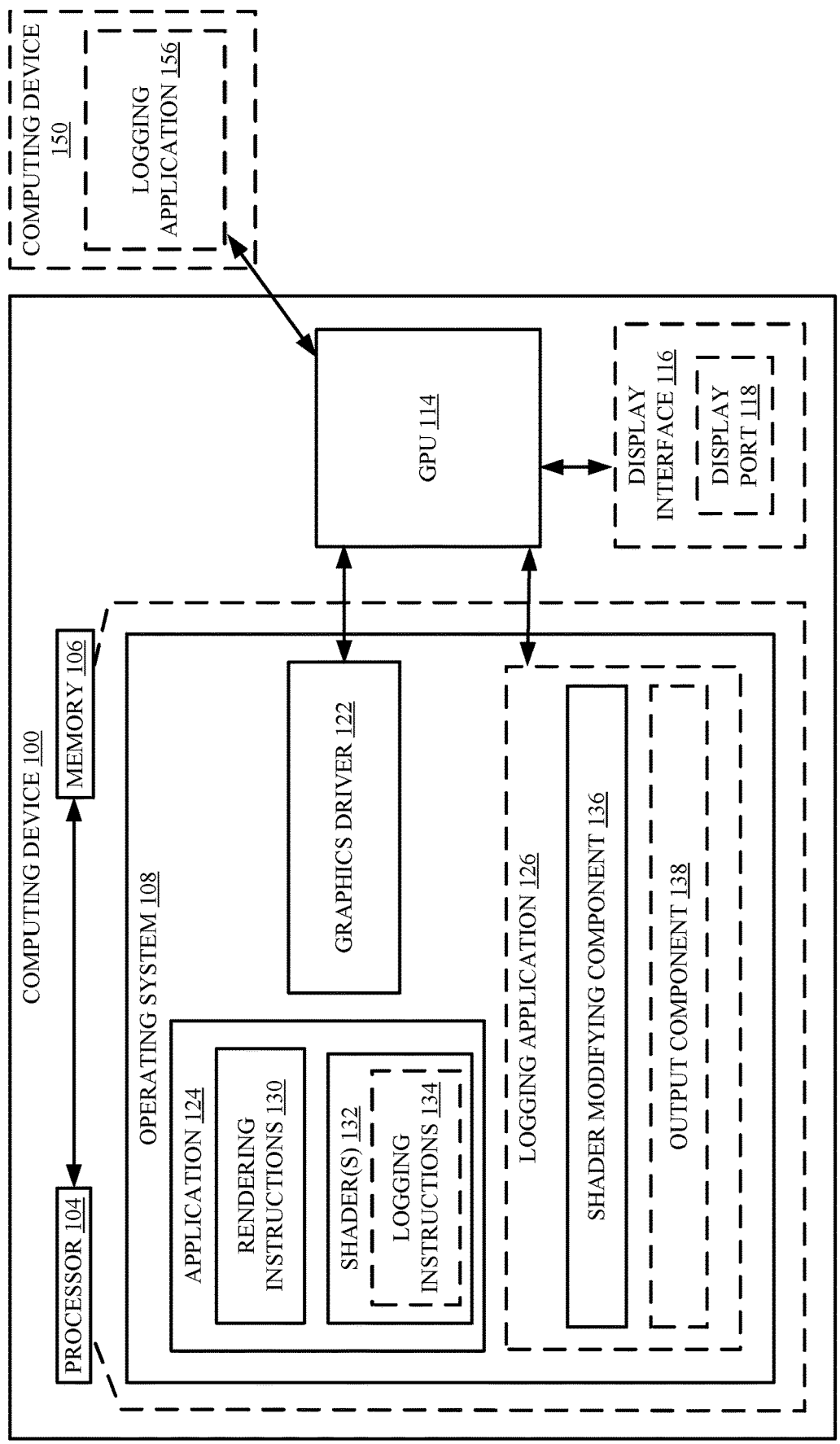
FIG. 1 is a schematic diagram of an example of a computing device for modifying operations of a graphics processing unit (GPU) in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to modifying operations of a graphics processing unit (GPU) for tracking and/or analysis thereof. In an example, one or more shaders, or other executable components associated with rendering graphics on the GPU, can be modified to include logging functionality to log one or more parameters during execution. For example, an application can generate a set of rendering instructions, which may include invoking one or more shaders or other threads of execution in processing the rendering instructions. In an example, a logging application can obtain a list of commands in a command buffer to be sent to the GPU (or associated graphics driver) for processing, which may include drawing commands, ray dispatching commands, commands related to executing one or more shaders, etc. In this example, the logging application can modify at least a portion of the one or more shaders to include instructions for logging one or more parameters such that the portion of the one or more shaders can log the one or more parameters in a log when executing, where the log may be stored in a file, a buffer in memory, or any other storage location from which the logged information can later be retrieved.

For example, the logging application can modify the portion of the one or more shaders to include instructions for logging a shader name or identifier, a time that execution of the shader begins and/or completes, a total time of execution for the shader, etc. In addition, for example, the shader(s) can be modified to log parameters related to performing rasterization, ray tracing, etc., such as memory accesses, ray dispatching and/or reflection information, etc. The logging application can replace the portion of the one or more shaders with the modified shaders, which may include replacing a pointer or other identifier in the command buffer with a pointer or other identifier of the modified shader(s). In another example, logging application can modify the portion of the shaders directly to include the logging functionality such that updating the command buffer may not be required to activate the logging. Moreover, for example, the logging application can modify the one or more shaders in the command buffer where the command buffer relates to commands to be executed on the GPU in real-time and/or in playing back captured GPU commands and/or associated rendering instructions. In any case, in this regard, logging can be performed by, or based on, the GPU executing commands from the command buffer without requiring support or additional functionality in the GPU or the corresponding graphics driver.

Figure 2:
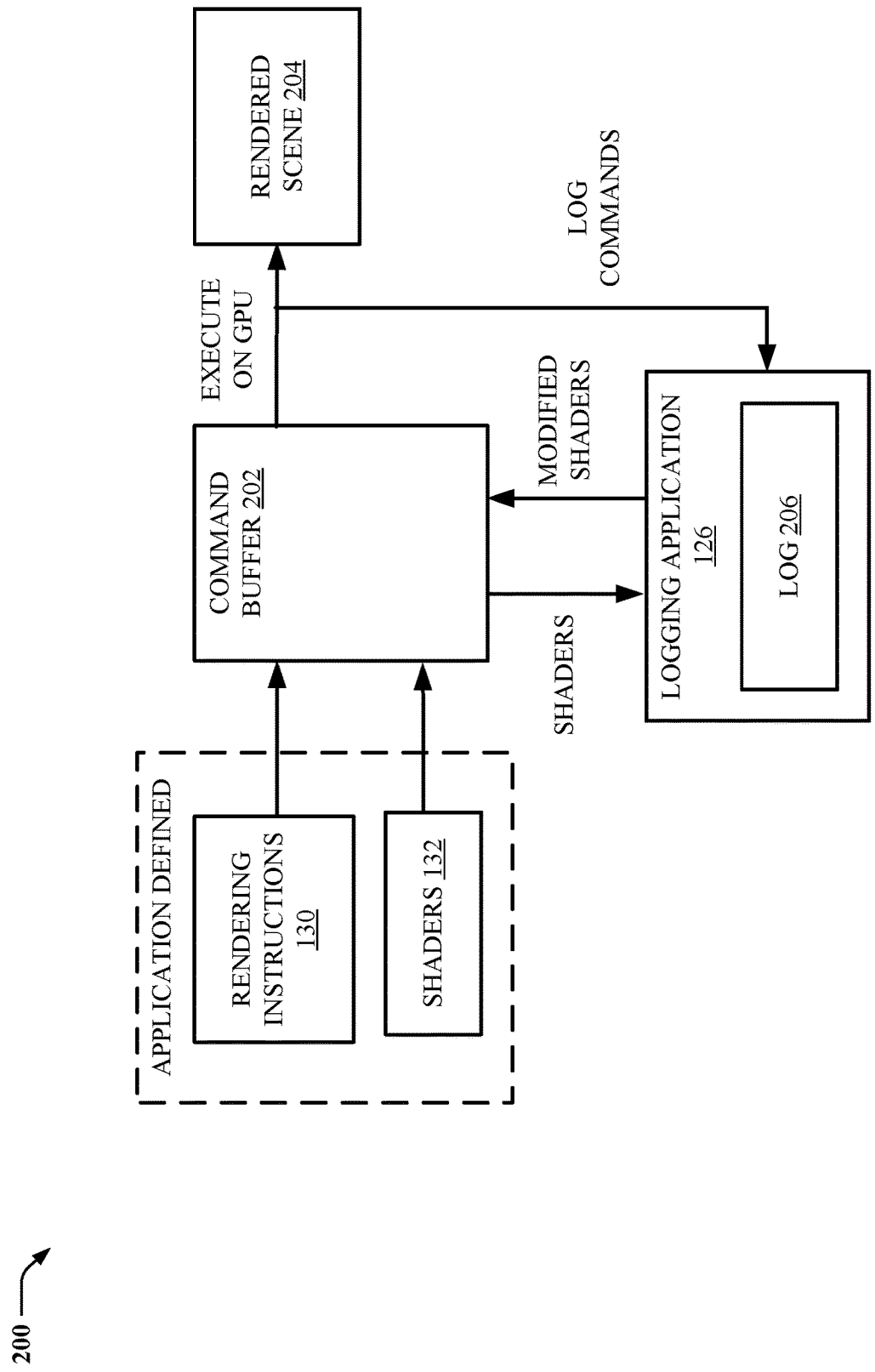
FIG. 2 is an example of a data flow diagram used in modifying GPU operations in accordance with examples described herein.
Figure 3:
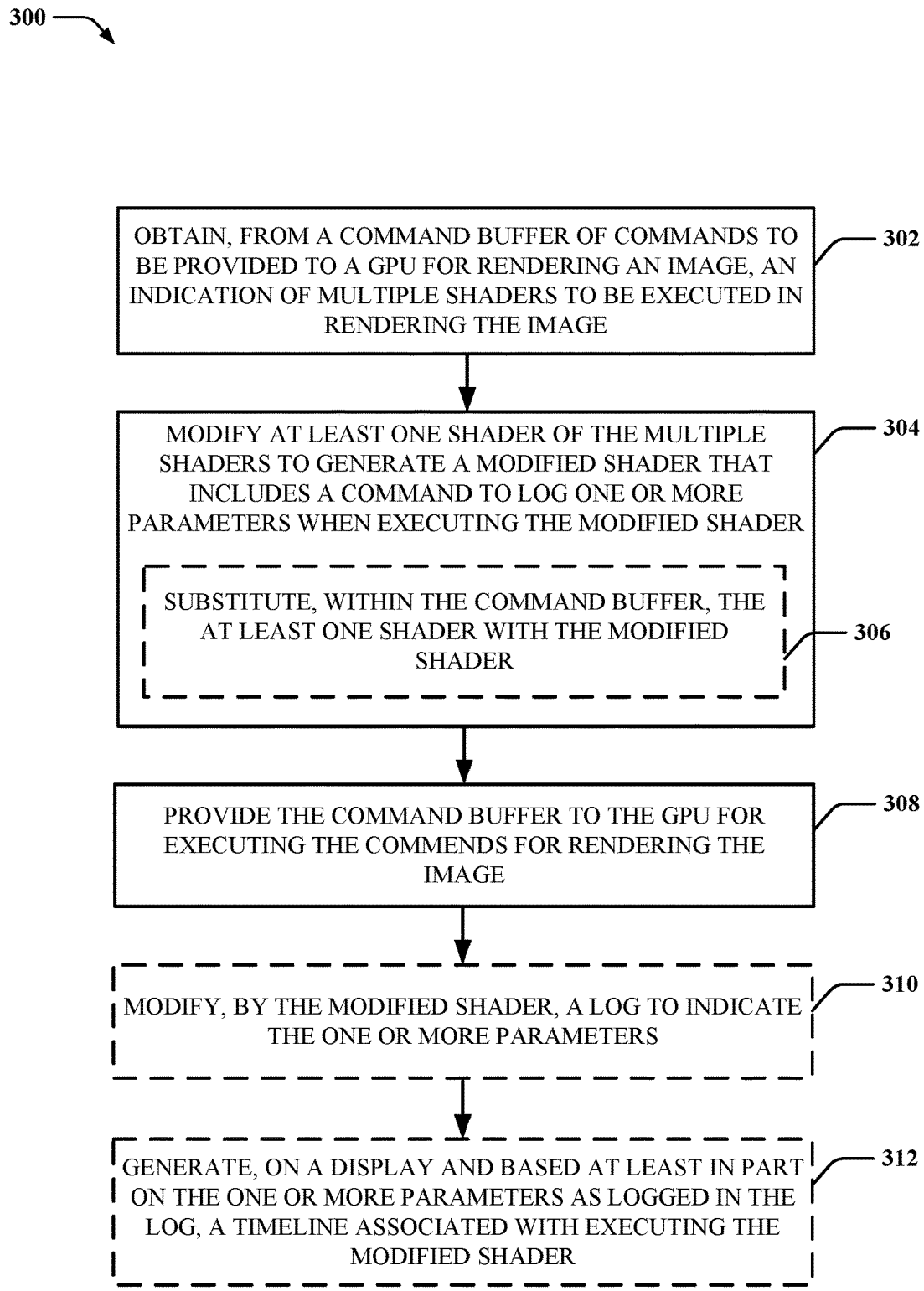
FIG. 3 is a flow diagram of an example of a method for modifying one or more shaders to track GPU operations in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for providing logging of GPU operations in rendering graphics. For example, computing device 100 can include or can otherwise be coupled with a processor 104 and/or memory 106, where the processor 104 and/or memory 106 can be configured to execute or store instructions or other parameters related to facilitating logging operations for a GPU, as described herein. Computing device 100 can execute an operating system 108 (e.g., via processor 104 and/or memory 106) for providing an environment for executing one or more applications. The computing device 100 can also include a GPU 114 for processing rendering instructions, and/or communicating associated commands to a display interface 116 to cause display of one or more images on a display, which may be coupled to the computing device 100 via a display port 118.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116. In an example, GPU 114 can support ray tracing, rasterization, or other mechanism for generating an image based on received rendering instructions.

In one example, an application 124 can operate (e.g., via operating system 108) to generate images for displaying via display interface 116. Application 124 may generate rendering instructions 130 and/or one or more shaders 132 for rendering an image, where the rendering instructions 130 may define geometry for an image related to ray tracing the image, rasterizing the image, etc., and the shaders 132 may be operable to further modify the geometry (e.g., to add color, lighting, or substantially any features) of the image or other purposes. For example, the shaders 132 can be a type of program implemented for execution via GPU 114 to perform shading of an image or other operations, where the shaders 132 can operate in a highly parallelized manner, which is well suited for GPU 114 architecture. In some examples, the shaders 132 can execute for substantially any purpose that may or may not be related to modifying the image, such as to perform shading as related to applying levels of light, darkness, color, etc. within the image, performing other types of post-processing on the image, and/or performing substantially any definable operation on the GPU 114. In one example, application 124 can generate the rendering instructions 130 using an application programming interface (API) provided by the graphics driver 122 that allows for defining image geometry. In addition, application 124 can define the one or more shaders 132 or other threads of executing to modify the geometry, etc., which may also be supported by the graphics driver 122. The graphics driver 122 can generate GPU-specific commands based on the rendering instructions, and can execute the shaders 132 via the GPU 114 to facilitate rendering of the image via GPU 114. In an example, the graphics driver 122 can generate the GPU-specific commands and provide to the GPU 114 in a separate thread of execution, and the GPU 114 can execute the commands and/or shaders in a different time domain than the generation and providing of the rendering instructions 130 and indication of the shaders 132 to the graphics driver 122 (e.g., at some indeterminable time after generation/providing of the rendering instructions 130). This can be referred to as deferred execution, and may complicate determining timing of operations associated with the GPU 114 (e.g., when trying to track time using an application executing via processor 104).

In this regard, a logging application 126 can be provided for modifying one or more shaders in a command buffer to include instructions for logging one or more parameters during execution. For example, the logging application 126 can include a shader modifying component 136 for identifying and modifying one or more shaders specified in a command buffer to include logging instructions 134 to log one or more parameters during execution of the shader(s). For example, the logging instructions 134 may correspond to instructions to write one or more log parameters to a log and/or to cause the logging application 126 to write to the log on the shader's behalf (e.g., based on the shader calling a callback function registered by the logging application 126 when modifying the shader). Logging application 126 can also optionally include an output component 138 for outputting the log and/or a representation thereof, such as a timeline, to allow for visualizing the log data collected from one or more shaders 132.

In an example, logging application 126 may execute on the same computing device 100 or as logging application 156 operating on a different computing device 150 (where the different computing device 150 can have a separate processor, memory, operating system, etc. to execute the logging application 156) so long as the logging application 126, 156 can at least communicate with GPU 114, graphics driver 122, or a related component (e.g., via an API), to modify the shader 132 to include logging instructions 134, receive log events or callbacks during execution of the shaders and/or the like. Though the components are only shown in logging application 126 in FIG. 1, logging application 156 when configured to operate on a different computing device 150 can include the similar or same components to achieve similar or same functionality as described herein for the logging application 126.

FIG. 2 illustrates an example of a data flow 200 of image data, including rendering instructions 130 and shaders 132, which can be defined by an application, to a rendered scene 204. Data flow 200 can be effectuated on a system architecture, such as computing device 100 shown in FIG. 1, and is thus described in conjunction with FIG. 1 in a non-limiting example.

For example, the rendering instructions 130 and/or shaders 132 can be input as commands in a command buffer 202 for executing on a GPU (e.g., GPU 114). In one example, the graphics driver 122 can generate the command buffer 202 as a list of GPU-specific commands based on the rendering instructions 130 and including commands for executing one or more shaders 132 to post-process or otherwise assist in generating the image of the rendered scene 204. In this example, logging application 126 can identify the shaders specified in the command buffer 202, and can modify the shaders to include logging instructions. In one example, logging application 126 can modify the shaders to include certain logging instructions, can generate copies of the shaders to modify and substitute in the command buffer 202 (e.g., by replacing a pointer or other identifier of the shader with a pointer or other identifier of the modified shader), etc.

For example, logging application 126 can modify the shaders in this regard as part of playing back the commands in command buffer 202 that were used to generate the rendered scene 204 to again generate the rendered scene 204 as part of a tool for analyzing GPU performance. In this regard, logging application 126 may include an interface for playing back the commands or rendering instructions 130/shaders 132 with logging enabled, and the logging application 126 can cause playback of captured rendering instructions 130.shaders 132 with the modified shaders. In another example, logging application 126 can modify the shaders 132 for executing commands in the command buffer 202 in generating the rendered scene 204 in real-time. In this example, logging application 126 may include an interface for indicating to log shader operations, as described further herein, which may include options to indicate information to be logged (e.g., shader identifier or name, start time, stop time, total execution time, rendering parameters related to features for rasterizing or ray tracing, etc.).

When the command buffer 202 is executed on the GPU (e.g., GPU 114), the GPU can execute the modified shaders inserted in the command buffer 202, which may include the one or more logging instructions. For example, the one or more logging instructions may generate log commands to log parameters in a log 206, which may be maintained by the logging application 126. For example, the log may be stored in a file, a buffer in memory 106, or substantially any storage location from which the logged information can later be retrieved. In one example, the logging instructions in the shaders can indicate to log parameters in the log 206, to call a function on the logging application 126 (e.g., a callback function) to log the parameters, and/or the like. In addition, as described, the logging instructions may be incorporated in the shaders such that the shaders execute the logging instructions as one of multiple instructions during execution of the shaders, to cause logging of the one or more parameters described above. Thus, more accurate logging information for GPU execution can be provided by altering the shaders that are executed by the GPU during deferred execution than can be attained by logging based on the application providing rendering instructions 130/shaders 132 to the command buffer 202.

FIG. 3 is a flowchart of an example of a method 300 for modifying shaders or other threads of execution to be executed when rendering graphics to log operations related to a GPU. For example, method 300 can be performed by the computing device 100, and is accordingly described with reference to FIGS. 1 and 2, as non-limiting examples of environments for carrying out method 300.

In method 300, at action 302, an indication of multiple shaders to be executed in rendering image can be obtained from a command buffer of commands to be provided to a GPU for rendering an image. In an example, shader modifying component 136, e.g., in conjunction with processor 104, memory 106, logging application 126, 156, etc., can obtain, from the command buffer (e.g., command buffer 202) of commands to be provided to a GPU (e.g., GPU 114) for rendering an image, an indication of the multiple shaders (e.g., shaders 132) to be executed in rendering the image. For example, an application 124 can generate rendering instructions 130 for rendering the image, which may include one or more draw commands, memory accessing commands, etc., and/or may specify the one or more shaders 132 for applying to the image. As described application 124 may generate the one or more rendering instructions 130, specify the one or more shaders 132, etc., via an API offered by the graphics driver 122 to operate the GPU 114.

For example, the application 124 may specify the one or more shaders 132 in the rendering instructions that may also include one or more parameters for executing the shaders, such as a shading rate, color modification parameter, tile size, or substantially any parameter that may relate to the image or may not relate to the image. The application 124 may provide the rendering instructions 130 and indication of shaders 132 to the command buffer 202 for processing in rendering the image, and the graphics driver 122, for example, can process the rendering instructions 130, apply or otherwise call the shaders 132 on the image to be rendered, etc., to generate GPU-specific commands that can cause the GPU 114 to render the image (e.g., via rasterization, ray tracing, or otherwise). In an example, shader modifying component 136 can obtain the indication of the multiple shaders from the command buffer 202 during an initial rendering of the image and/or during a playback of the commands in the command buffer 202 (e.g., as specified by the logging application 126, e.g., for the purposes of debugging the rendering of the image).

In method 300, at action 304, at least one shader of the multiple shaders can be modified to generate a modified shader that includes a command to log one or more parameters when executing the modified shader. In an example, shader modifying component 136, e.g., in conjunction with processor 104, memory 106, logging application 126, 156, etc., can modify the at least one shader of the multiple shaders (e.g., shaders 132) to generate the modified shader that includes the command (e.g., logging instructions 134) to log one or more parameters when executing the modified shader. For example, shader modifying component 136 can introduce the logging instructions 134 into one or more shaders 132 as additional software code to call one or more functions that result in the logging, where the logging instructions 134 may indicate parameters for logging. The parameters, for example, may specify data to be logged, such as a shader name or identifier, a current time, parameters related to the processing performed by the shader (such as one or more rasterization or ray tracing features that may include a shading rate, tile size, ray reflection information, etc., number of threads executing, and/or the like), a logging location (e.g., a location or pointer to a log, etc.), and/or the like.

In an example, shader modifying component 136 may automatically insert logging instructions 134 into the shaders 132 to include at least an instruction to log a shader name (or other identifier) and/or a start time as an initial instructions when the shader 132 executes, and/or an end time or total computed execution time as a last instruction before the shader 132 terminates. In an example, shader modifying component 136 may insert such logging instructions 134 based on an indication via a user interface to enable shader logging. In an example, shaders 132 may be provided either in high level source form (such as High Level Shader Language (HLSL), OpenGL Shader Language (GLSL), Metal Shading Language, etc.) using an intermediate language or intermediary compiled format (such as DirectX Byte Code (DXBC), DirectX Intermediate Language (DXIL), Standard Portable Intermediate Representation (SPIR), such as SPIR-V, etc.) or directly using the native compiled instruction format of a specific target GPU model. In any case, for example, shader modifying component 136 can modify the shader(s) 132 based at least in part on identifying the location in the intermediate language where logging is to be inserted (e.g., a beginning of the shader program, an end of the shader program, or a specific location within the shader which is identified by scanning it for a particular type of instruction that is to be instrumented, etc.). Once the location has been identified, shader modifying component 136 can insert new instructions at that point, which when executed can carry out the action of logging data, as described. The result is a modified shader, using the same format as the original shader (high level source, intermediary compiled format, or native GPU instructions, etc.), having the logging instructions inserted into the code using appropriate syntax (e.g., based on the format). If high level source is being modified, shader modifying component 136 may also recompile the shader(s) 132 (via the normal shader compiler) to produce intermediary compiled format, which can then be provided to the graphics driver 122 for execution.

In another example, the logging application 126, 156 may provide a user interface to allow modification of the shader 132 software code instructions to include logging instructions 134 at a location, and/or including certain logging parameters, specified via the user interface (e.g., by a developer). In one example, shader modifying component 136 can modify the shaders 132 indicated in the command buffer. In another example, shader modifying component 136 can generate modified shaders based on a copy of the shaders 132, which are modified to include the logging instructions 134. In yet another example, shader modifying component 136 can store modified shaders that are associated with one or more of the shaders 132, and can use the modified shader(s) instead where a given shader maps to a modified shader.

In some of these examples, in modifying the at least one shader at action 304, optionally at action 306, the at least one shader can be substituted, within the command buffer, with the modified shader. In an example, shader modifying component 136, e.g., in conjunction with processor 104, memory 106, logging application 126, 156, etc., can substitute, within the command buffer (e.g., command buffer 202), the at least one shader (e.g., at least one of shaders 132) with the modified shader, where the modified shader includes logging instructions 134. Thus, for example, where the at least one shader itself is not modified, but rather another shader is modified or associated with the at least one shader, the shader modifying component 136 can substitute the at least one shader with the modified shader, which may include substituting a pointer or other specifier of the at least one shader within the command buffer 202 with a pointer or other specifier of the modified shader.

In method 300, at action 308, the command buffer can be provided to the GPU for executing the commands for rendering the image. In an example, graphics driver 122, e.g., in conjunction with processor 104, memory 106, logging application 126, 156, etc., can provide the command buffer (e.g., command buffer 202 with the modified shaders) to the GPU (e.g., GPU 114) for executing the commands for rendering the image. For example, graphics driver 122 can generate GPU-specific commands for executing the rendering instructions 130 and/or applying the shaders 132 indicated in the command buffer. In any case, graphics driver 122 can apply, or instruct the GPU 114 to apply, the modified shader(s) to facilitate execution of the logging instructions 134 in the shader(s) 132. This can before playback of the command buffer 202, where the logging application 126, 156 is playing back the command buffer 202 using the modified shaders 132 after initial rendering of the image (e.g., to debug or otherwise view metrics related to shader execution).

As a result, optionally at action 310, a log can be modified, by the modified shader, to indicating the one or more parameters. In an example, shader 132, e.g., in conjunction with processor 104, memory 106, logging application 126, 156, GPU 114, etc., can modify the log (e.g., log 206 or another log) to indicate the one or more parameters. For example, shader 132 can execute the logging instructions 134 when the GPU 114 causes execution of the shader 132. In an example, the logging instructions 134 may indicate the log 206 (e.g., or a pointer thereto) to indicate the log for logging the parameters indicated in the logging instructions 134. In another example, the logging instructions 134 may include a callback to logging application 126, 156 with the one or more parameters to cause the logging application 126, 156 to log the one or more parameters in log 206, etc. In any case, the GPU 114 executing the shaders 132 can obtain the requested parameters (e.g., shader identifier, current time, etc.) based on the logging instructions 134 and can cause logging of the parameters based on the logging instructions 134 introduced into the shaders 132.

In method 300, optionally at action 312, a timeline associated with executing the modified shader can be generated on a display based at least in part on the one or more parameters as logged in the log. In an example, output component 138 e.g., in conjunction with processor 104, memory 106, and/or logging application 126, 156, etc., can generate, on a display (e.g., a display of computing device 100, 150) and based at least in part on the one or more parameters as logged in the log (e.g., log 206), the timeline associated with executing the modified shader. For example, logging application 126, 156 can read and process the log 206 (e.g., after, during, etc., rendering of the image) to obtained the logged shader information, such as shader identifiers, start time for the given shader, or one or more other parameters related to processing of the shader, etc., and output component 138 can display a timeline of shader execution. In other example, output component 138 can display other representations of additional or alternative output indicated in the log 206 based on logging instructions 134.

Figure 4:
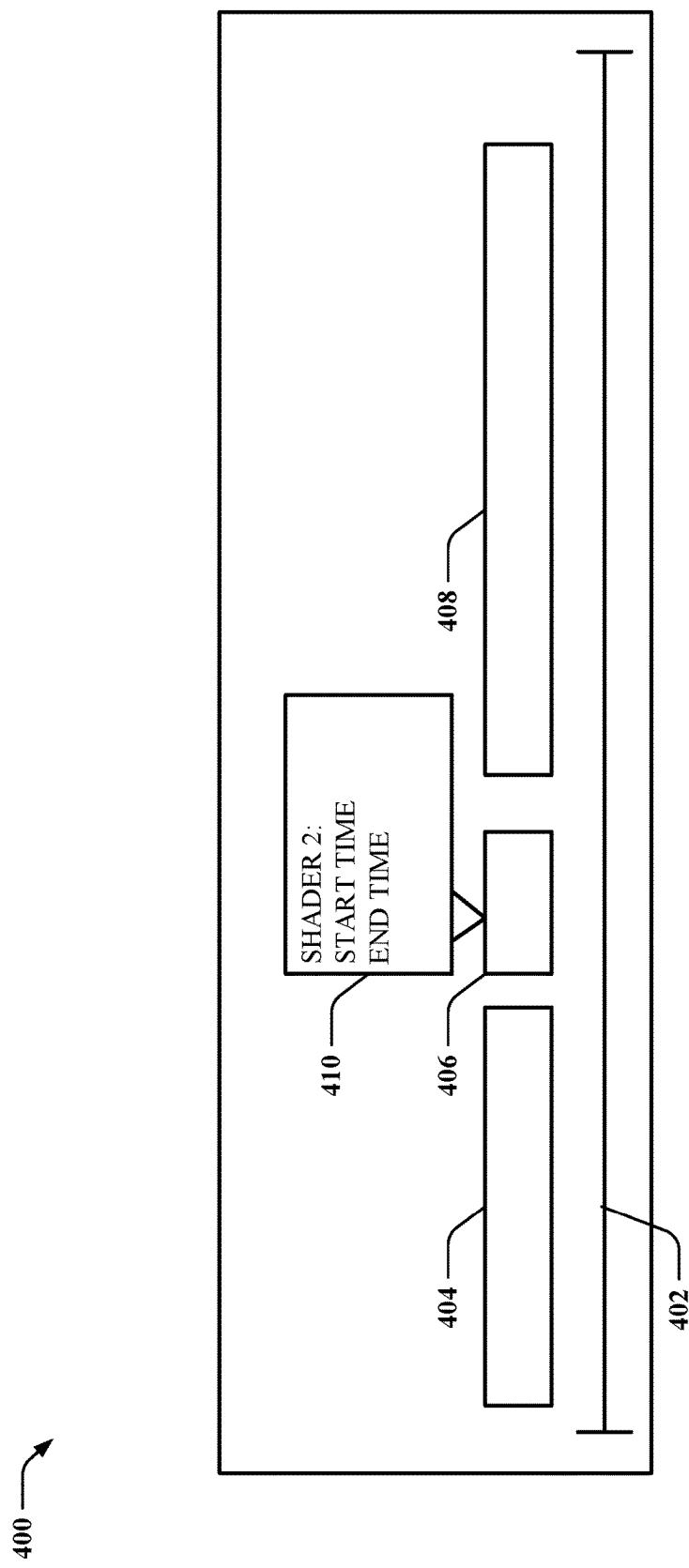
FIG. 4 illustrates an example of an interface for displaying a timeline related to the operations of a GPU in accordance with examples described herein.

An example is shown in FIG. 4, which illustrates an example of an interface 400 for displaying on a display to indicate execution times of different shaders in rendering an image. For example, the data for the interface 400 can be obtained from a log generated by one or more shaders 132 modified to include logging instructions 134, such as log 206. In this example, the log 206 can include logged events from the shaders 132 that indicate an identifier of the shader, a start time, and an end time for executing the given shader. Thus, interface 400 can be a graphical representation of a timeline 402 indicated timing for executing different shaders, where each bar 404, 406, 408 represents execution time for a different sequentially executed shader along the timeline 402. In this example, selection of a bar, such as bar 406, can cause display of a box 410 indicating additional information regarding the shader represented by the bar 406, such as a shader identifier, start time, and end time, as recorded in the log 206. This interface can provide a graphical representation of shader execution times, which can enable a developer to visualize the execution times based on the data in the log 206. In addition, using the shader 132 to log the data can provide a more accurate representation of at least timing data of when the shader actually executes, given the deferred rendering behavior of the GPU 114.

The interface 400 in FIG. 4 is a non-limiting example, and substantially any collections of parameters in the log 206 can be logged to display a graphical representation thereof. Moreover, the log 206 can be viewed to determine the metrics associated with the shaders. In addition, for example, the logging instructions 134 may cause different logs to be created for different purposes (e.g., different logs for different shaders or groups of shaders). In an example, output component 138 may combine data from one or more logs to create an interface providing a graphical representation of logged data. In any case, logging can be implemented in the shaders 132 without requiring additional modifications or functions of the GPU 114, other than perhaps an ability for the GPU 114 to determine the current time for logging in some examples.

Figure 5:
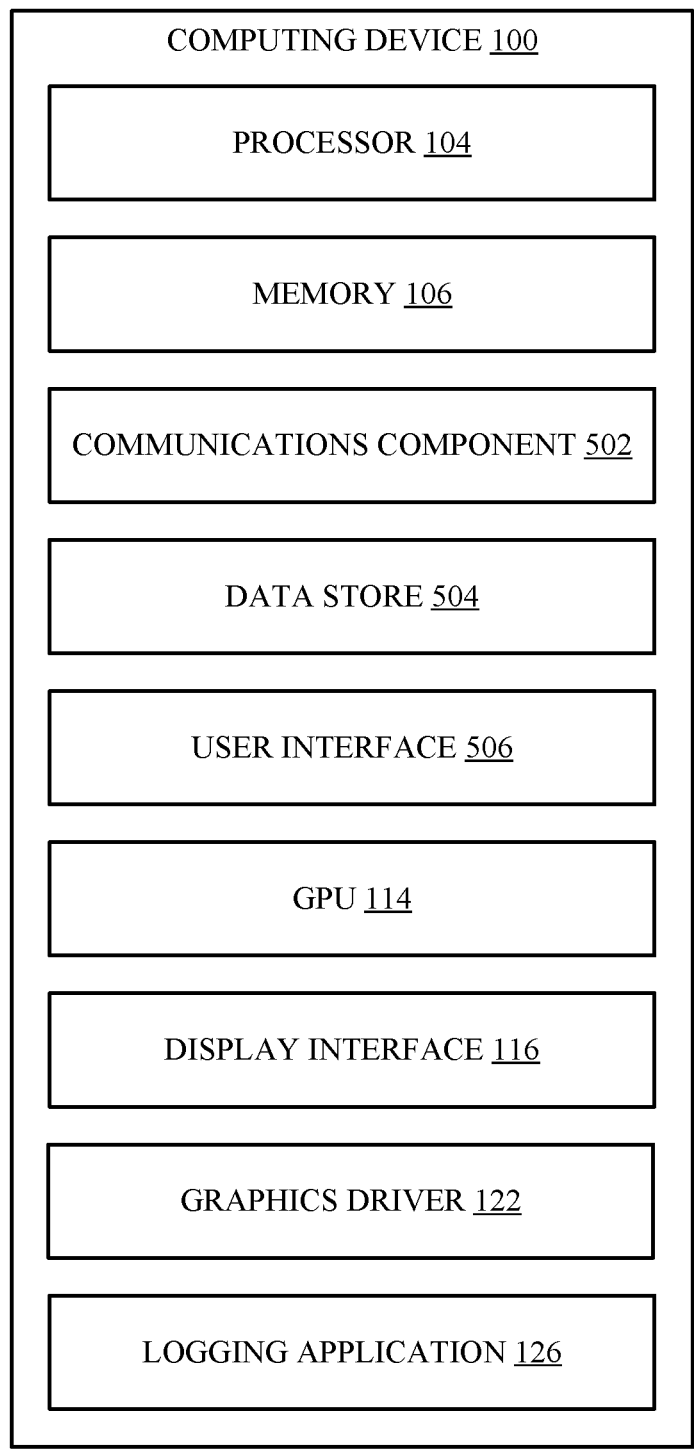
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as graphics driver 122, logging application 126, and/or components thereof, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices. For example, communications component 502 can carry communications between logging application 126 and a GPU on another device, between distributed components of logging application 126, etc.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, such as graphics driver 122, logging application 126, and/or components thereof, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof. In an example, user interface component 506 can display or can include interface 400 or similar interfaces to display memory usage information, as described herein.

Computing device 100 can also include a GPU 114, as described herein, for rendering images based on ray tracing instructions received from processor 104. GPU 114 can additionally send signals via a display interface 116 to cause display of the rendered images on a display (not shown). Additionally, computing device 100 may include a graphics driver 122, as described herein, to provide GPU-specific commands for rasterizing, ray tracing, etc., images, as described herein. Additionally, computing device 100 may include a logging application 126, as described herein, to instrument shaders with logging instructions to cause the shaders to log information when executed.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for modifying operations of a graphics processing unit (GPU) for tracking, comprising:
   obtaining, from a command buffer of commands to be provided to the GPU for rendering an image, an indication of multiple shaders to be executed in rendering the image;
   inserting one or more logging instructions into at least one shader of the multiple shaders to generate a modified shader that logs one or more parameters when executed;
   substituting, within the command buffer, an indication of the at least one shader with a second indication of the modified shader;
   providing the command buffer, including the second indication of the modified shader, to the GPU for executing the commands for rendering the image including executing the modified shader; and
   modifying, by the modified shader and based on the one or more logging instructions, a log to indicate the one or more parameters when executing the modified shader.

2. The method of claim 1, wherein the command to log the one or more parameters comprises a command to log an identifier of the modified shader.

3. The method of claim 1, wherein the command to log the one or more parameters comprises a command to log a time associated with executing the modified shader.

4. The method of claim 1, wherein the command to log the one or more parameters comprises a command to log a ray tracing or rasterization feature associated with executing the modified shader.

5. The method of claim 1, further comprising generating, on a display and based at least in part on the one or more parameters as logged in the log, a timeline associated with executing the modified shader among the multiple shaders.

6. A computing device for modifying operations of a graphics processing unit (GPU) for tracking, comprising:
   a memory storing one or more parameters or instructions for executing an operating system and one or more applications including a logging application; and
   at least one processor coupled to the memory, wherein the at least one processor is configured to:
   obtain, from a command buffer of commands to be provided to the GPU for rendering an image, an indication of multiple shaders to be executed in rendering the image;
   insert one or more logging instructions into at least one shader of the multiple shaders to generate a modified shader that logs one or more parameters when executed;

substitute, within the command buffer, an indication of the at least one shader with a second indication of the modified shader; and provide the command buffer, including the second indication of the modified shader, to the GPU for executing the commands for rendering the image including executing the modified shader.

7. The computing device of claim 6, wherein the command to log the one or more parameters comprises a command to log an identifier of the modified shader.

8. The computing device of claim 6, wherein the command to log the one or more parameters comprises a command to log a time associated with executing the modified shader.

9. The computing device of claim 6, wherein the command to log the one or more parameters comprises a command to log a ray tracing or rasterization feature associated with executing the modified shader.

10. The computing device of claim 6, wherein the at least one processor is further configured to modify, by the modified shader, a log to indicate the one or more parameters when executing the modified shader.

11. The computing device of claim 10, wherein the at least one processor is further configured to generate, on a display and based at least in part on the one or more parameters as logged in the log, a timeline associated with executing the modified shader among the multiple shaders.

12. A non-transitory computer-readable medium, comprising code executable by one or more processors for modifying operations of a graphics processing unit (GPU) for tracking, the code comprising code for:

obtaining, from a command buffer of commands to be provided to the GPU for rendering an image, an indication of multiple shaders to be executed in rendering the image;

inserting one or more logging instructions into at least one shader of the multiple shaders to generate a modified shader that logs one or more parameters when executed;

substituting, within the command buffer, an indication of the at least one shader with a second indication of the modified shader; and providing the command buffer, including the second indication of the modified shader, to the GPU for executing the commands for rendering the image including executing the modified shader.

13. The non-transitory computer-readable medium of claim 12, wherein the command to log the one or more parameters comprises a command to log an identifier of the modified shader.

14. The non-transitory computer-readable medium of claim 12, wherein the command to log the one or more parameters comprises a command to log a time associated with executing the modified shader.

15. The non-transitory computer-readable medium of claim 12, wherein the command to log the one or more parameters comprises a command to log a ray tracing or rasterization feature associated with executing the modified shader.

16. The non-transitory computer-readable medium of claim 12, further comprising code for modifying, by the modified shader, a log to indicate the one or more parameters when executing the modified shader.

17. The non-transitory computer-readable medium of claim 16, further comprising code for generating, on a display and based at least in part on the one or more parameters as logged in the log, a timeline associated with executing the modified shader among the multiple shaders.

* * * * *